United States Patent [19]
Adrian et al.

[11] Patent Number: 5,511,647
[45] Date of Patent: Apr. 30, 1996

[54] BALUSTRADE INFORMATION DISPLAY FOR A PASSENGER CONVEYING DEVICE

[75] Inventors: Willy Adrian, Obernkirchen; Peter Borchers, Stadthagen; Michael Fohrer, Berlin; Knuth Wallbaum, Wunstorf; Gerald Wente, Pohle; Rainer Zimmerman, Beimerstetten, all of Germany

[73] Assignee: Otis Elevator Company, Farmington, Conn.

[21] Appl. No.: 224,434

[22] Filed: Apr. 8, 1994

[51] Int. Cl.[6] .................................................. B65G 17/00
[52] U.S. Cl. .................................................. 198/335
[58] Field of Search .................................. 198/335, 337

[56] References Cited

U.S. PATENT DOCUMENTS

| | | | |
|---|---|---|---|
| 2,756,323 | 7/1956 | Tusley | 240/2 |
| 3,057,991 | 10/1962 | Grenadier | 240/2 |
| 3,065,336 | 11/1962 | Stevens | 240/9 |
| 3,131,871 | 5/1964 | Foulds | 240/2 |
| 4,756,398 | 7/1988 | Watanabe et al. | 198/324 |
| 5,040,659 | 8/1991 | Saito et al. | 198/335 X |
| 5,067,062 | 11/1991 | Rülke | 362/146 |

FOREIGN PATENT DOCUMENTS

| | | |
|---|---|---|
| 1274286 | 8/1968 | Germany . |
| 3843090 | 9/1989 | Germany .................. 198/335 |
| 9316096 | 12/1993 | Germany . |
| 0040988 | 4/1978 | Japan ...................... 198/335 |
| 4-75995 | 3/1992 | Japan ...................... 198/335 |
| 5-97370 | 5/1993 | Japan ..................... B66B 23/22 |
| 2104471 | 3/1983 | United Kingdom ........... 198/335 |
| 2224987 | 5/1990 | United Kingdom ........... B66B 31/00 |

OTHER PUBLICATIONS

U.S. Patent Appln. Ser. No. 8/137,451 filed Oct. 13, 1993 assigned to Otis Elevator Co. entitled "Escalator or Moving Walkway Balustrade Illumination".

Primary Examiner—James R. Bidwell

[57] ABSTRACT

An illuminated information display is provided for a passenger conveying device comprising a light source, a housing, and a display panel for mounting on the outer decking of passenger conveying device balustrade. According to an aspect of the present invention, a balustrade for a passenger conveying device is provided comprising an illuminated information display. According to another aspect of the present invention, a balustrade outer decking is provided having a light source incorporated therein.

53 Claims, 4 Drawing Sheets

BALUSTRADE INFORMATION DISPLAY FOR A PASSENGER CONVEYING DEVICE

BACKGROUND OF THE INVENTION

1. Technical Field

This invention pertains to balustrades for passenger conveying devices in general, and in particular to balustrade lighting for passenger conveying devices.

2. Background Information

Escalators, moving walkways, and other people moving devices efficiently move a large volume of pedestrian traffic from one point to another. Passengers step on moving steps (or belts, or pallets) and are transported along a defined path. For safety reasons, passenger handrails are provided, traveling in the same direction and speed as the steps. A balustrade assembly supports and guides one of the handrails on each side of the steps.

In most instances each balustrade assembly includes balustrade panels (typically glass) which extend up from a base to support the handrail. In other instances the base extends up to just below the handrail. Externally, the base consists of a number of enclosure panels including an outer decking an outer cladding, an inner profile, and a skirt panel. The outer decking and outer cladding enclose the mechanics on the side of the balustrade panel opposite the moving steps. The inner profile and skirt panel enclose the mechanics adjacent the moving steps.

Passenger conveying devices, and escalators in particular, are often situated in shopping malls, department stores, and other public areas where aesthetic appearance is of considerable importance. To increase the aesthetic appeal of the device, it is known to position lighting under the handrail or in the base of the balustrade. In particular, lighting may be used to compliment escalators having glass balustrade panels. Despite lighting being generally known, a person of skill in the art will recognize that it is desirable to provide new, functional and aesthetically pleasing lighting which is distinguishable from known embodiments.

Information relating to the use of the passenger conveying device (e.g., what lies at the other end of the device, or what direction the escalator is operating, etc.) is often displayed on signs positioned overhead or adjacent the device. These signs often detract from the aesthetic appeal of the passenger conveying device. A person of skill in the an will recognize that is desirable to provide an aesthetically pleasing and functional device for displaying information.

SUMMARY OF THE INVENTION

It is, therefore, an object of the present invention to provide an aesthetically pleasing balustrade lighting for the outer decking of a passenger conveying device.

Another object of the present invention is to provide balustrade lighting capable of conveying information.

Still another object of the present invention is to provide an information conveying device which can readily change the information displayed.

According to the present invention, an illuminated information display is provided for a passenger conveying device. The information display comprises a light source, a housing, and a display panel for mounting on the outer decking of passenger conveying device balustrade.

According to an aspect of the present invention, a balustrade outer decking is provided comprising an illuminated information display.

According to another aspect of the present invention, a balustrade outer decking is provided having a light source incorporated therein.

An advantage of the present invention is that information can be displayed in an aesthetically pleasing manner.

Another advantage of the present invention is that balustrade lighting is provided in an aesthetically pleasing manner.

Still another advantage of the present invention is that the information displayed can be readily changed.

Still another advantage of the present invention is that the information display and balustrade lighting can easily be retrofit onto existing passenger conveying devices.

Still another advantage of the present invention is that information formerly displayed on independent signs can now be displayed on the passenger conveying device.

Still another advantage of the present invention is that the information display can be used for alternative purposes such as advertising, direction indication, decoration, and others.

These and other objects, features and advantages of the present invention will become more apparent in light of the detailed description of the best mode embodiment thereof, as illustrated in the accompanying drawings.

BEST MODE FOR CARRYING OUT THE INVENTION

Figures 1, 4:
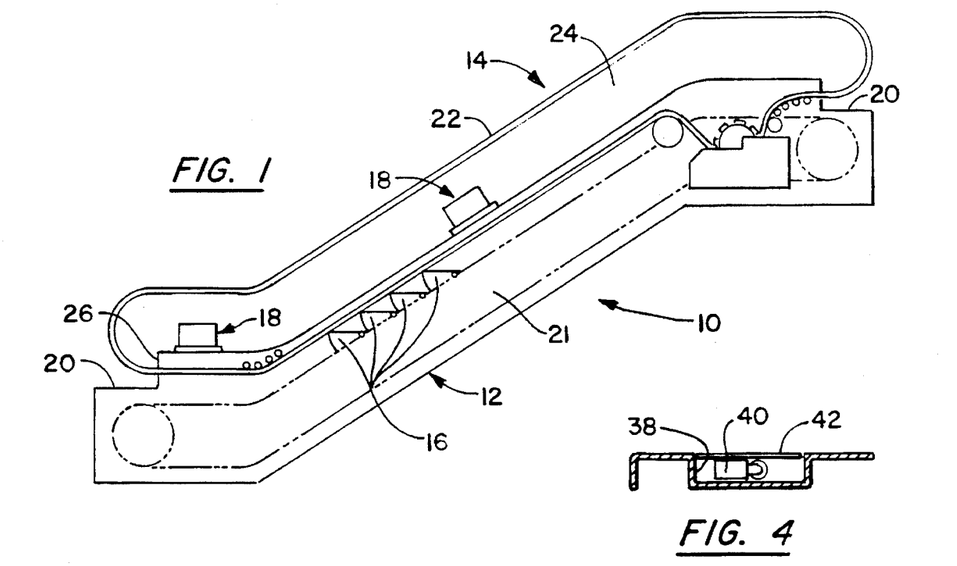
FIG. 1 is a diagrammatic view of an escalator.
FIG. 4 is a diagrammatic cross-sectional view of the outer decking shown in FIG. 3, further illustrating the light source within the channel.

Referring to FIG. 1, an escalator 10 is shown diagrammatically having a truss frame 12, a pair of balustrades 14, a plurality of steps 16 traveling in an endless loop, and an illuminated information display 18. Passengers (not shown) are conveyed from the entrance to the exit of the escalator 10 by the plurality of steps 16 attached to a step chain 17. The truss frame 12 includes a pair of landings 20 connected by an inclined midsection 21. The balustrades 14 are positioned on each side of the moving steps 16 and extend the length of the escalator 10. Each balustrade 14 comprises a handrail 22 traveling in a closed loop as is known in the art. In the exposed portion of the handrail 22 path, the handrail 22 is supported by a plurality of balustrade panels 24 extending out from a base 26. Typically the balustrade panels 24 are made of clear safety glass. In some escalators, however, the base 26 extends up to just below the handrail 22, thereby eliminating the need for balustrade panels 24.

Figure 2:
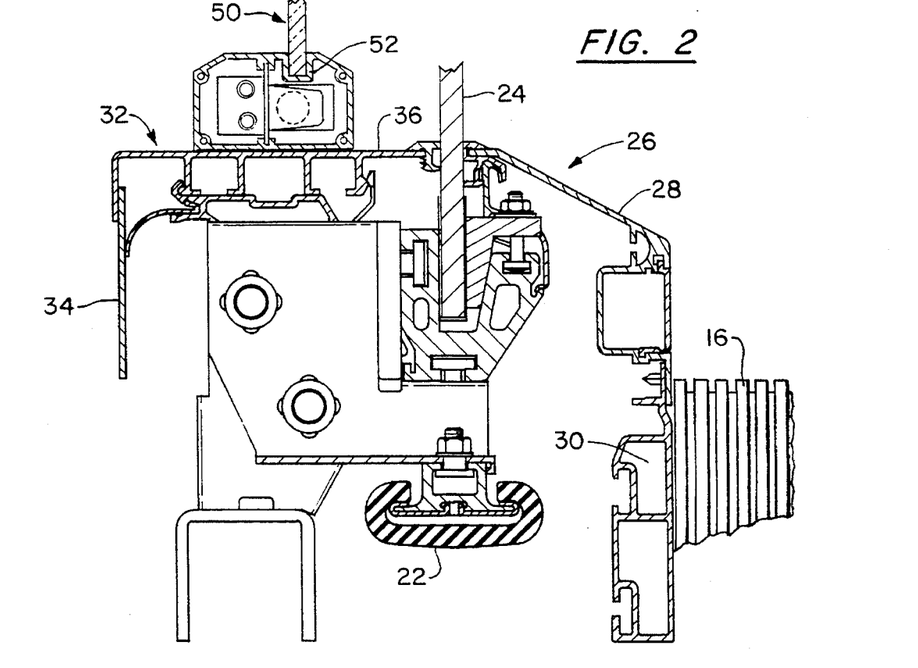
FIG. 2 is a diagrammatic cross-sectional view of a balustrade having an information display mounted on the top surface of the outer decking.
Figure 3:
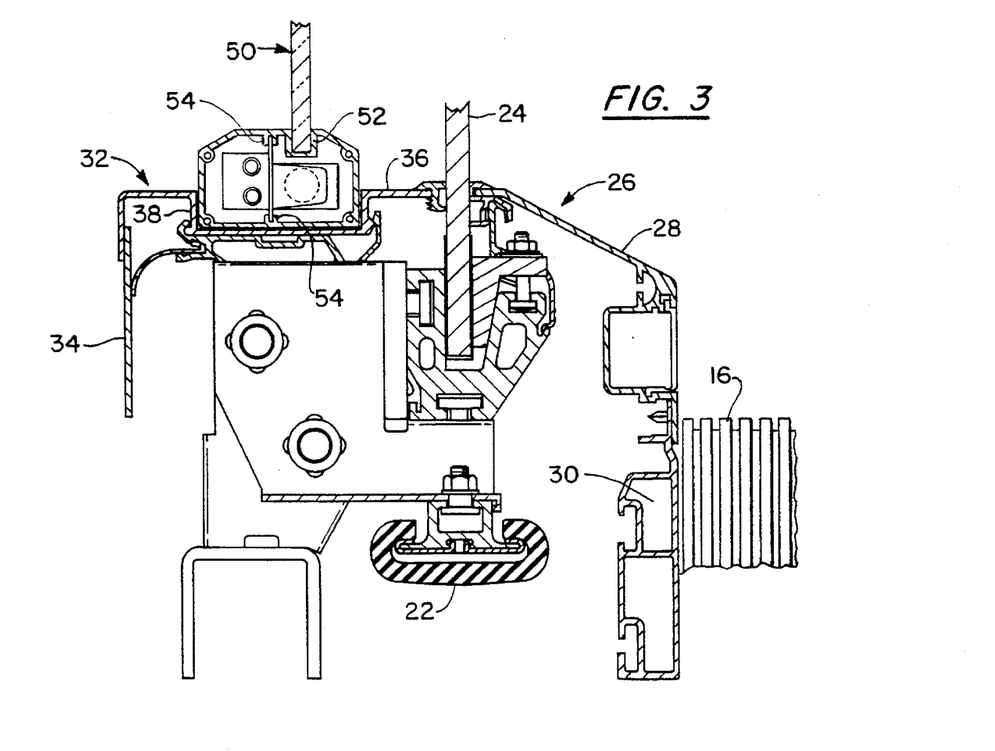
FIG. 3 is a diagrammatic cross-sectional view of a balustrade having an information display mounted in a channel within the top surface of the outer decking.

Referring to FIGS. 2 and 3, the base 26 includes an inner decking 28 and skirt panel 30 on the side of the handrail 22 adjacent the moving steps 16, and an outer decking 32 and outer cladding 34 on the opposite side of the handrail 22. In a first embodiment shown in FIG. 2, the outer decking 32 has a top surface 36 extending in a lengthwise direction (i.e., into the page as shown). In a second embodiment shown in FIGS. 3, 4 and 5, the top surface 36 of the outer decking 32 includes a channel 38. A light source 40 (FIGS. 4 and 5) is received within the channel 38, enclosed by a cover 42 through which light may pass. The cover 42 is shown flush with the top surface, but may alternatively extend outwardly or inwardly, and/or may include a contoured surface.

Figure 6:
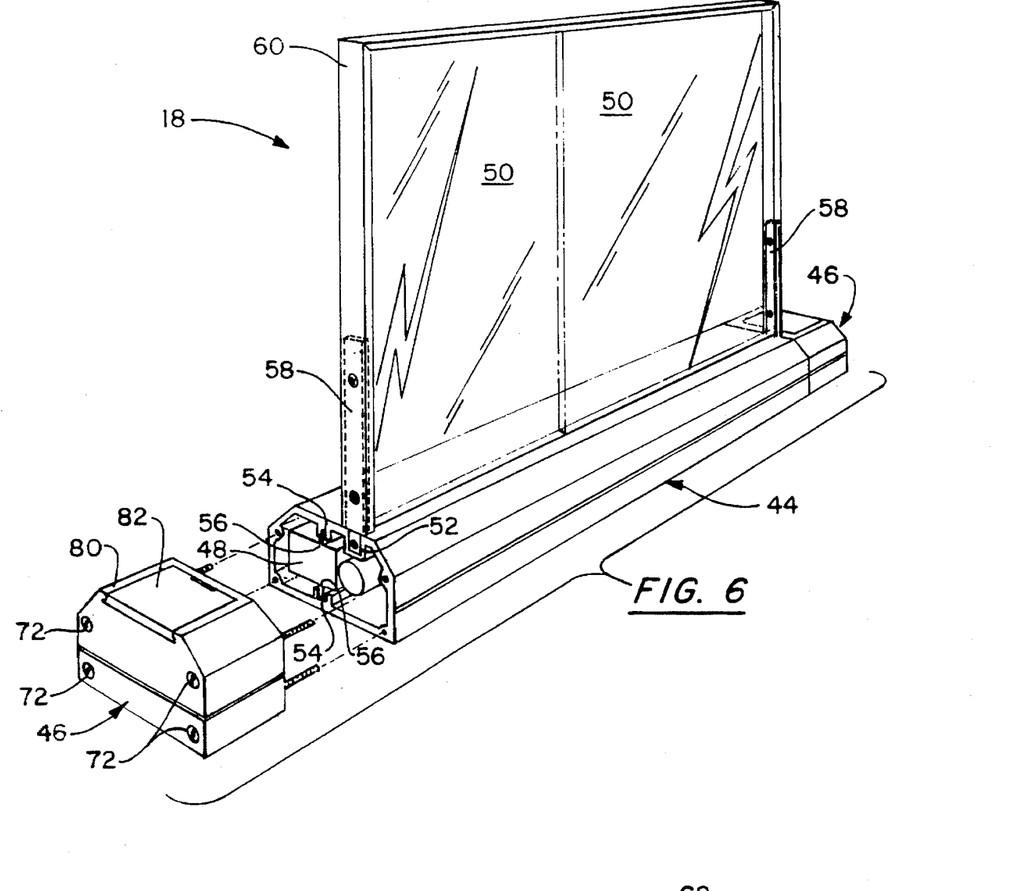
FIG. 6 is a perspective view of an information display, having an end cap shown in an exploded view.

Referring to FIG. 6, the information display 18 comprises a housing 44, a pair of end caps 46, a light source 48, and a display panel 50. In the preferred embodiment the light source 48 is a fluorescent light disposed within, and extending the length of the housing 44. A person of skill in the art will recognize that a variety of light sources may be used alternatively. The housing 44 comprises an extruded aluminum cross-sectional profile extending lengthwise. The housing 44 includes a first slot 52 (see also FIGS. 2 and 3) for receiving the display panel 50 and a pair of second slots 54 for securing the light source 48 within the housing 44. Flanges 56 extending out from the light source 48 are received within the second slots 54. A pair of panel supports 58 extend out from the housing 44, one on each side of the display panel 50, to secure the display panel 50. An aluminum frame 60 may also be included around the periphery of the display panel 50.

Figure 7:
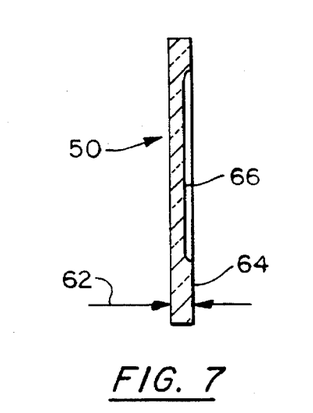
FIG. 7 is a cross-sectional view of a solid display panel.

Referring to FIG. 7, in one embodiment the display panel 50 comprises a clear, plastic material formed in a pane-like shape having a thickness 62. Geometric shapes are milled into the thickness 62 of the display panel 50 conforming to whatever information is to be displayed. For instance, arrows may be milled into the panel 50 to convey a direction. Alternatively, a product logo may be milled in the panel 50 as an advertisement. A person of skill in the art will recognize that any number of designs may be utilized for a variety of reasons. In this embodiment, the outer surface 64 of the pane may be described as a first surface and the other surfaces 66 created by the milling process may be described as a second surface.

Figure 8:
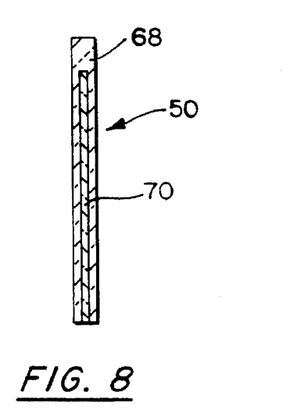
FIG. 8 is a cross-sectional view of an assembled display panel comprising more than one material.

Referring to FIG. 8, the display panel 50 may alternatively comprise an assembly of more than one material 68, 70, including but not limited to plastics and glasses. The materials 68, 70 have different physical properties, including but not limited to density, porosity, color, and clarity, which cause one material 68, 70 to appear differently than the other(s) 70, 68 when light is passed through the display panel 50. The materials 68, 70 are arranged in geometric shapes that cause the desired information is to be displayed. The materials may be combined by horizontal or vertical layering (shown in FIG. 8) or any combination thereof.

Referring to FIG. 6, in still another embodiment the information display 18 may include more than one display panel 50, as is shown in phantom. The different panels 50 illuminated by the single light source 48 could be used as the mechanism to display the information. Alternatively, a plurality of light sources disposed within the housing could be used to distinguish the different display panels 50 and the information displayed therein.

Figure 9:
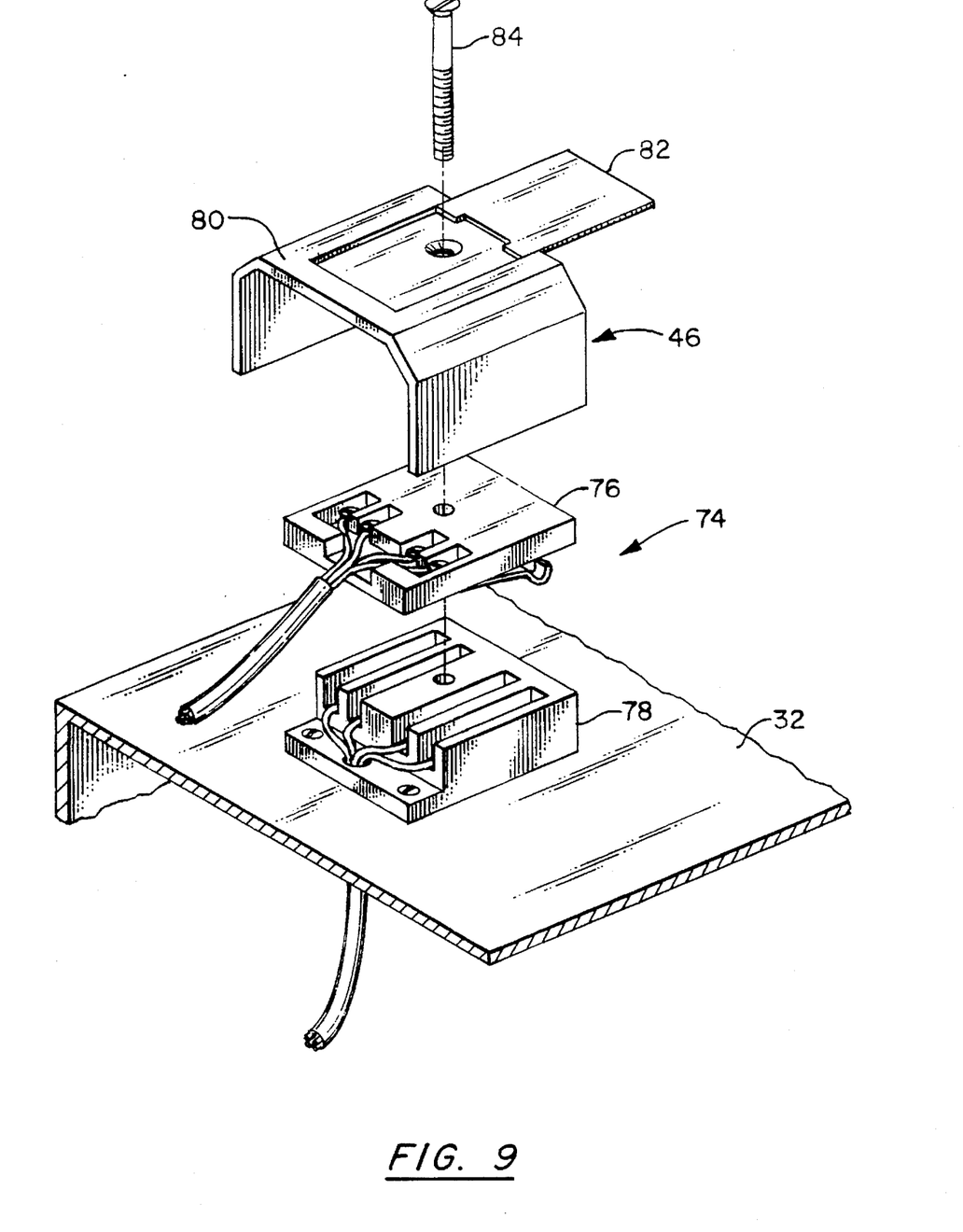
FIG. 9 is an exploded view of an end cap and an electrical connector.

Referring to FIGS. 6 and 9, the end caps 46 are attached to each end of the housing 44 by conventional fasteners 72. FIG. 9 illustrates that at least one of the end caps 46 includes an electrical connector 74 having a male 76 and female 78 half. One of the male 76 or female 78 halves is fixed within the end cap 46 and the other is fixed to the outer decking 32 of the balustrade 14 (see FIG. 4). The connector half 76, 78 within the end cap 46 is electrically connected to the light source 48 (FIG. 5) disposed within the housing 44. The other connector half 78, 76 is electrically connected to a power source. The top outer surface 80 of each end cap 46 includes a sliding plate 82 which may be slid open to expose a fastener 84 for securing the information display 18 (FIG. 6) to the outer decking. The other end cap 46 may include another electrical connector 74 or a fastener block (not shown) for securing the information display 18 to the outer decking 32.

Figure 5:
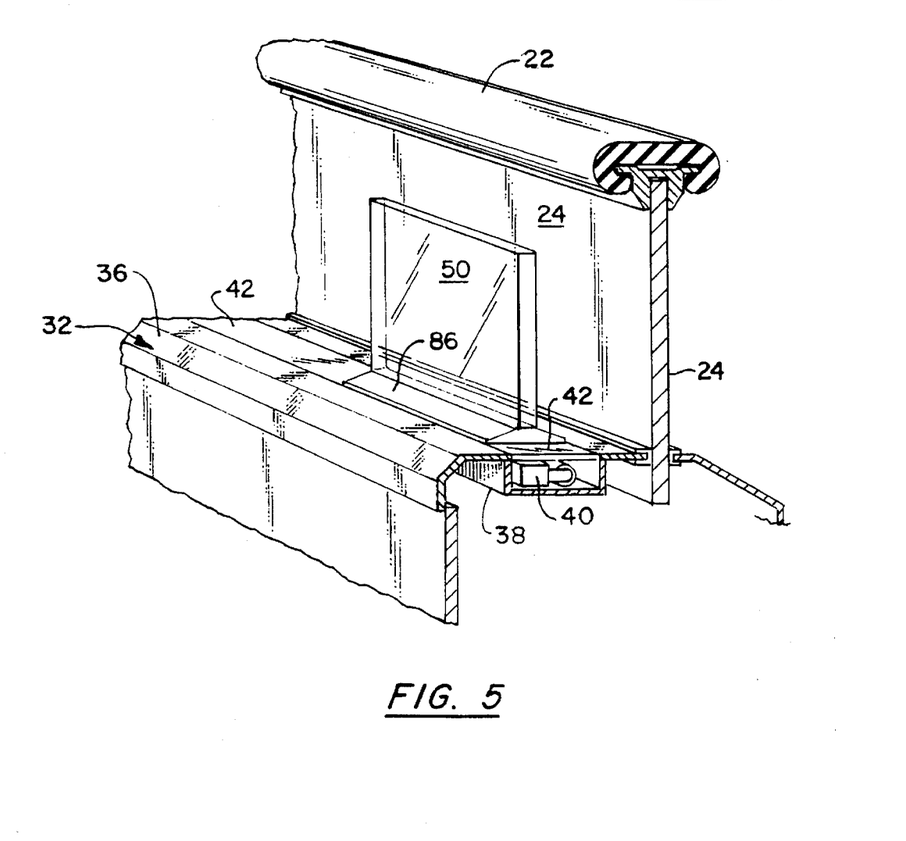
FIG. 5 is a perspective view of a balustrade having an outer decking comprising an information display.

Referring to FIGS. 3 and 5, the information display(s) may be mounted within the channel 38 in the manner described heretofore. In that case, the light sources 40 within the channel may be positioned on both sides of the information display(s) 18. Alternatively, the information display 18 may comprise a housing 86 (FIG. 5) that encloses the channel 38 and the light source 40 within the channel 38. In this embodiment, the information display 18 utilizes the light source 40 extending throughout the channel 38.

Although this invention has been shown and described with respect to the detailed embodiments thereof, it will be understood by those skilled in the art that various changes in form and detail thereof may be made without departing from the spirit and scope of the claimed invention. For example, the housing 44 may be assembled or formed by a process other than extrusion. Moreover, the housing 44 may comprise a material other than aluminum.

We claim:

1. A balustrade outer decking, comprising:

a channel extending lengthwise;

a light source, disposed in said channel;

a cover, wherein said cover encloses said channel and said light source disposed therein, said cover allowing light to pass out of said channel;

an information display, disposed in said channel, said information display comprising:

a housing, for enclosing a portion of said channel; and a display panel, supported by said housing, said display panel having a thickness, a first portion and a second portion;

wherein light emanating from said light source and passing within said display panel differentiates said first and second portions, thereby allowing information to be displayed by said display panel.

2. A balustrade outer decking according to claim 1, wherein said first portion comprises a first material and said second portion comprises a second material, said first and second materials having different physical properties, such that said first material is visually distinguishable from said second material when light passes through said materials.

3. A balustrade for a passenger conveying device having a plurality of moving treadplates, comprising:

a handrail, traveling in a closed 10012 about said balustrade;

an inner decking, positioned adjacent said moving steps:

an outer decking; and an information display disposed on said outer decking, said information display comprising:

a housing;

a pair of end caps, having means for attaching said housing to said outer decking;

a light source, disposed within said housing; and a display panel, supported by said housing, said display panel having a thickness, a first surface, and a second surface wherein said thickness of said display panel is greater at said first surface than at said second surface:

wherein light emanating from said light source and passing within said display panel differentiates said first and second surfaces, thereby allowing information to be displayed by said display panel.

4. A balustrade for a passenger conveying device according to claim 3, wherein at least one of said end caps comprise an electrical connector, wherein said electrical connector connects said light source to an electrical power source.

5. A balustrade for a passenger conveying device according to claim 4, wherein said electrical connector comprises:

a mating male and female pair;

wherein one of said male and female pair is mounted within said end cap and electrically connected to said light source, and the other of said male and female pair is mounted on said outer decking and electrically connected to said power source; wherein joining said male and female pair together electrically connects said light source.

6. A balustrade for a passenger conveying device according to claim 5, wherein said information displayed by said display panel is changeable by changing said display panel.

7. A balustrade outer decking, comprising:

a channel extending lengthwise;

a light source, disposed in said channel;

a cover, wherein said cover encloses said channel and said light source disposed therein, said cover allowing light to pass out of said channel;

an information display, disposed in said channel, said information display comprising:

a housing, for enclosing a portion of said channel; and a display panel, supported by said housing, said display panel having a thickness, a first surface and a second surface;

wherein light emanating from said light source and passing within said display panel differentiates said first and second surfaces, thereby allowing information to be displayed by said display panel.

8. A balustrade outer decking according to claim 7, wherein said thickness of said display panel is greater at said first surface than at said second surface.

9. A balustrade for a passenger conveying device having a plurality of moving treadplates, comprising:

a handrail, traveling in a closed loop about said balustrade;

an inner decking, positioned adjacent said moving steps;

an outer decking; and an information display disposed on said outer decking, said information display comprising:

a housing;

a pair of end caps, having means for attaching said housing to said outer decking;

a light source, disposed within said housing; and a display panel, supported by said housing, said display panel having a thickness, a first portion, and a second portion wherein said first portion comprises a first material and said second portion comprises a second material, said first and second materials having different physical properties, such that said first material is visually distinguishable from said second material when light passes through said materials;

wherein light emanating from said light source and passing within said display panel differentiates said first and second portions, thereby allowing information to be displayed by said display panel.

10. A balustrade for a passenger conveying device according to claim 9, wherein at least one of said end caps comprise an electrical connector, wherein said electrical connector connects said light source to an electrical power source.

11. A balustrade for a passenger conveying device according to claim 10, wherein said electrical connector comprises:

a mating male and female pair;

wherein one of said male and female pair is mounted within said end cap and electrically connected to said light source, and the other of said male and female pair is mounted on said outer decking and electrically connected to said power source;

wherein joining said male and female pair together electrically connects said light source.

12. A balustrade for a passenger conveying device according to claim 11, wherein said information displayed by said display panel is changeable by changing said display panel.

13. A passenger conveying device comprising:

a frame, having a first landing and a second landing;

a plurality of steps, said steps attached in an endless loop extending between said first and second landings;

a balustrade, extending lengthwise adjacent said plurality of steps, said balustrade including:

a handrail;

an inner decking, said inner decking positioned between said steps and said handrail;

an outer decking, having a lengthwise extending channel, wherein said handrail is positioned between said outer decking and said steps;

a first light source, disposed in said channel;

a cover, for covering said channel and thereby enclosing said light source, said cover allowing light to pass out of said channel; and an information display disposed within said channel.

14. A passenger conveying device according to claim 13, wherein said information display comprises:

a housing;

a display panel, supported by said housing;

wherein said first light source within said channel extends beneath said housing and display panel, and wherein light emanates from said first light source and passes within said display panel such that information is displayed by said display panel.

15. A passenger conveying device according to claim 13, wherein said information display comprises:

a housing;

a display panel, supported by said housing, said display panel having a thickness, a first surface, and a second surface;

wherein said first light source within said channel extends beneath said housing and display panel; and wherein light emanating from said first light source and passing within said display panel differentiates said first and second surfaces, thereby allowing information to be displayed by said display panel.

16. A passenger conveying device according to claim 13, wherein said information display comprises:

a housing;

a second light source, disposed within said housing; and a display panel, supported by said housing, said display panel having a thickness, a first surface, and a second surface;

wherein light emanating from said second light source and passing within said display panel differentiates said first and second surfaces, thereby allowing information to be displayed by said display panel.

17. A passenger conveying device according to claim 16, wherein said thickness of said display panel is greater at said first surface than at said second surface.

18. A passenger conveying device according to claim 17, wherein said information display further comprises:
   a pair of end caps, having means for attaching said housing to said outer decking.

19. A passenger conveying device according to claim 18, wherein at least one of said end caps comprises an electrical connector, wherein said electrical connector connects said second light source to an electrical power source.

20. A passenger conveying device according to claim 19, wherein said electrical connector comprises:
   a mating male and female pair;
   wherein one of said male and female pair is mounted within said end cap and electrically connected to said second light source, and the other of said male and female pair is mounted on said outer decking and electrically connected to said power source;
   wherein joining said male and female pair together electrically connects said light source.

21. A passenger conveying device according to claim 20, wherein said information displayed by said display panel is changeable by changing said display panel.

22. A passenger conveying device according to claim 13, wherein said information display comprises:
   a housing;
   a second light source, disposed within said housing; and
   a display panel, supported by said housing;
   wherein light emanates from said second light source and passes within said display panel such that information is displayed by said display panel.

23. A passenger conveying device according to claim 13, wherein said information display includes a housing, a display panel supported by said housing, and a pair of end caps, said end caps having means for attaching said housing to said outer decking.

24. A passenger conveying device according to claim 23, wherein said display panel has a thickness, a first surface, and a second surface, wherein light emanating from said light source and passing within said display panel differentiates said first and second surfaces, thereby allowing information to be displayed by said display panel.

25. A passenger conveying device according to claim 23, wherein said display panel has a thickness, a first portion, and a second portion, wherein light emanating from said light source and passing within said display panel differentiates said first and second portions, thereby allowing information to be displayed by said display panel.

26. A balustrade outer decking, comprising:
   a channel extending lengthwise;
   a first light source, disposed in said channel;
   a cover, wherein said cover encloses said channel and said first light source disposed therein, said cover allowing light to pass out of said channel;
   an information display, disposed in said channel, said information display comprising:
   a housing; and
   a second light source, disposed in said housing;
   a display panel, supported by said housing, said display panel having a thickness, a first surface and a second surface;
   wherein light emanating from said second light source and passing within said display panel differentiates said first and second surfaces, thereby allowing information to be displayed by said display panel.

27. A balustrade outer decking according to claim 26, wherein said thickness of said display panel is greater at said first surface than at said second surface.

28. A balustrade outer decking according to claim 27, wherein said information display further comprises:
   a pair of end caps, having means for attaching said housing to said outer decking.

29. A balustrade outer decking according to claim 28, wherein at least one of said end caps comprise an electrical connector, wherein said electrical connector connects said second light source to an electrical power source.

30. A balustrade outer decking, comprising:
   a channel extending lengthwise;
   a first light source, disposed in said channel;
   a cover, wherein said cover encloses said channel and said first light source disposed therein, said cover allowing light to pass out of said channel;
   an information display, disposed in said channel, said information display comprising:
   a housing, and
   a second light source, disposed in said housing;
   a display panel, supported by said housing, said display panel having a thickness, a first portion and a second portion;
   wherein light emanating from said second light source and passing within said display panel differentiates said first and second portions, thereby allowing information to be displayed by said display panel.

31. A balustrade outer decking according to claim 30, wherein said first portion comprises a first material and said second portion comprises a second material, said first and second materials having different physical properties, such that said first material is visually distinguishable from said second material when light passes through said materials.

32. A balustrade outer decking according to claim 31, wherein said information display further comprises:
   a pair of end caps, having means for attaching said housing to said outer decking.

33. A balustrade outer decking according to claim 32, wherein at least one of said end caps comprise an electrical connector, wherein said electrical connector connects said second light source to an electrical power source.

34. A balustrade outer decking according to claim 33, wherein said electrical connector comprises:
   a mating male and female pair;
   wherein one of said male and female pair is mounted within said end cap and electrically connected to said second light source, and the other of said male and female pair is mounted on said outer decking and electrically connected to said power source;
   wherein joining said male and female pair together electrically connects said second light source.

35. A balustrade for a passenger conveying device having a plurality of moving treadplates, comprising:
   a handrail, traveling in a closed loop about said balustrade;
   an inner decking, positioned adjacent said moving steps;
   an outer decking; and
   an information display disposed on said outer decking, said information display comprising:
   a housing;

a light source;

a display panel, supported by said housing; and a pair of end caps, having means for attaching said housing to said outer decking wherein light emanates from said light source and passes within said display panel such that information is displayed by said display panel.

36. A balustrade for a passenger conveying device according to claim 35, wherein said light source is disposed within said housing, wherein at least one of said end caps comprise an electrical connector, and wherein said electrical connector connects said light source to an electrical power source.

37. A balustrade for a passenger conveying device according to claim 36, wherein said electrical connector comprises:

a mating male and female pair;

wherein one of said male and female pair is mounted within said end cap and electrically connected to said light source, and the other of said male and female pair is mounted on said outer decking and electrically connected to said power source;

wherein joining said male and female pair together electrically connects said light source.

38. A balustrade for a passenger conveying device according to claim 37, wherein said information displayed by said display panel is changeable by changing said display panel.

39. A balustrade for a passenger conveying device according to claim 35, wherein said outer decking includes a lengthwise extending channel having said information display disposed therein and a cover, wherein a light source is disposed in said channel, and wherein said cover extends over said channel and thereby encloses said light source, said cover allowing light to pass out of said channel.

40. A balustrade for a passenger conveyor according to claim 39, wherein said display panel has a thickness, a first surface, and a second surface, wherein light emanating from said information display light source and passing within said display panel differentiates said first and second surfaces, thereby allowing information to be displayed by said display panel.

41. A balustrade for a passenger conveyor according to claim 39, wherein said display panel has a thickness, a first portion, and a second portion, wherein light emanating from said information display light source and passing within said display panel differentiates said first and second portions, thereby allowing information to be displayed by said display panel.

42. A balustrade for a passenger conveying device according to claim 39, wherein said light source within said channel extends beneath said housing and display panel to define the light source for the information display, and wherein light emanating from said light source within said channel passes within said display panel such that information is displayed by said display panel.

43. A balustrade for a passenger conveying device according to claim 35, wherein said display panel has a thickness, a first surface, and a second surface, wherein light emanating from said light source and passing within said display panel differentiates said first and second surfaces, thereby allowing information to be displayed by said display panel.

44. A balustrade for a passenger conveying device according to claim 35, wherein said display panel has a thickness, a first portion, and a second portion, wherein light emanating from said light source and passing within said display panel differentiates said first and second portions, thereby allowing information to be displayed by said display panel.

45. A balustrade outer decking comprising:

a channel extending lengthwise;

a light source, disposed in said channel;

a cover, wherein said cover encloses said channel and said light source disposed therein, said cover allowing light to pass out of said channel; and an information display disposed within said channel.

46. A balustrade outer decking according to claim 45, wherein said information display comprises:

a housing;

a display panel, supported by said housing;

wherein said light source within said channel extends beneath said housing and display panel, and wherein light emanates from said light source within said channel and passes within said display panel such that information is displayed by said display panel.

47. A balustrade outer decking according to claim 45, wherein said information display comprises:

a housing;

a second light source, disposed within said housing; and a display panel, supported by said housing;

wherein light emanates from said second light source and passes within said display panel such that information is displayed by said display panel.

48. A balustrade outer decking according to claim 45, wherein said information display includes a housing, a display panel supported by said housing, and a pair of end caps, said end caps having means for attaching said housing to said outer decking.

49. A balustrade outer decking according to claim 48, wherein said display panel has a thickness, a first surface, and a second surface, wherein light emanating from said light source and passing within said display panel differentiates said first and second surfaces, thereby allowing information to be displayed by said display panel.

50. A balustrade outer decking according to claim 48, wherein said display panel has a thickness, a first portion, and a second portion, wherein light emanating from said light source and passing within said display panel differentiates said first and second portions, thereby allowing information to be displayed by said display panel.

51. A balustrade for a passenger conveyor having a plurality of moving treadplates, comprising:

a handrail, traveling in a closed loop about said balustrade;

an inner decking, positioned adjacent said moving steps; and an outer decking, having a lengthwise extending channel, wherein said handrail is positioned between said outer decking and said steps:

a light source disposed in said channel;

a cover, for covering said channel and thereby enclosing said light source, said cover allowing light to pass out of said channel; and an information display disposed within said channel.

52. A balustrade for a passenger conveyor according to claim 51, wherein said information display comprises:

a housing;

a display panel, supported by said housing;

wherein said light source within said channel extends beneath said housing and display panel, and wherein light emanates from said light source within said channel and passes within said display panel such that information is displayed by said display panel.

53. A balustrade for a passenger conveyor according to claim 51, wherein said information display comprises:
a housing;
a second light source, disposed within said housing; and
a display panel, supported by said housing;

wherein light emanates from said second light source and passes within said display panel such that information is displayed by said display panel.

* * * * *